INVENTORS
PAUL L. SHULTZ
AND
ROBERT J. BRETL
BY
ATTORNEY

May 21, 1968    P. L. SHULTZ ET AL    3,383,933
ENGINE SUPPORT AND BELT DRIVE APPARATUS
Filed Dec. 6, 1966    2 Sheets-Sheet 2

INVENTORS
PAUL L. SHULTZ
AND
ROBERT J. BRETL
BY
*Jerome A. Gross*
ATTORNEY

United States Patent Office 3,383,933
Patented May 21, 1968

3,383,933
ENGINE SUPPORT AND BELT
DRIVE APPARATUS
Paul L. Shultz and Robert J. Bretl, Menominee, Mich.,
assignors to R. J. Enstrom Corporation, Menominee,
Mich., a corporation of Michigan
Filed Dec. 6, 1966, Ser. No. 599,635
9 Claims. (Cl. 74—227)

ABSTRACT OF THE DISCLOSURE

For belt driven helicopter engine installations, a resilient engine suspension strut is combined with a constant-force belt tensioning means, to permit freer oscillatory movements of the engine. A suspension strut, free to swing about the horizontal transmission shaft, supports the engine's driving sheave on a universal bearing. The strut is elastically cushioned for both axial and torsional resiliency, permitting engine oscillatory movements which lengthen and shorten the distance to the belt-driven sheave. Constant belt tension is maintained by a spring capsule, so pivot-mounted that as the spring deflection is increased, the lever arm at which its force operates decreases.

---

The present invention relates generally to belt drive aircraft engine installations and more particularly to that type of helicopter engine installation in which an engine is mounted resiliently beneath a transmission shaft to which the engine's power is transmitted by a belt drive.

U.S. Patent No. 3,252,474 issued May 31, 1966 shows such an engine installation, in which the helicopter transmission is supported with relative rigidity from the main structure of the aircraft, above an engine whose forward end is mounted below the transmission on resilient or "shock" mounts, with its crankshaft end projecting horizontally aft. A belt drive sheave on the crankshaft powers a shaft thereabove projecting horizontally from the transmission; this serves to supply the power to the transmission and thence to the rotor mast, as well as to transmit power aft to the tail rotor. To support and stabilize the aft end of the engine, a suspension strut is pivotally mounted on the transmission shaft, for free lateral swinging. At its lower end the suspension strut has a forward projecting stub shaft on which a universal bearing is mounted. This universal bearing is received within the aft side of the hub of the belt drive sheave.

In that invention the suspension strut established an absolute distance between the crankshaft and the transmission shaft. Swinging movements of the suspension strut about the transmission shaft plus movements of the engine relative to the universal bearing, were the only provisions for oscillatory movements at the crankshaft end.

The principal purpose of the present invention is to provide an improved apparatus which will more thoroughly isolate engine oscillations from the airframe and power drive system, consistently with the isolation properties of the resilient mounts on which the opposite end of the engine is supported; and thus to achieve smoother operation than has heretofore been possible. Specific purposes include avoiding coupling between the several types of oscillatory excitations and minimizing wear on the bearings.

These, and other objects which will be apparent from this specification, are achieved in the present invention by re-designing the suspension strut from one which establishes an absolute spacing from the transmission shaft, to one which permits resilient cushioned axial deflection as well as torsional deflection; and incorporating in the belt drive an idler means which maintains the belt resiliently at driving tension and compensates for the alternate shortening and lengthening of the spacing of the engine shaft from the transmission shaft. In the preferred embodiment illustrated, the idler is tensioned by a pivot-mounted spring capsule so pivot-mounted that the lever arm at which the spring force is exerted changes to compensate for deflection, and thus maintains the belt in tight driving relationship. The new engine support strut and associated mechnaism thus accommodates vertical oscillations of the engine, and in cooperation with the universal bearing, more adequately accommodates pitching and yawing oscillations.

A preferred embodiment of the present invention is shown in the accompanying drawings in which:

FIG. 1 is an elevational view, partly schematic and fragmentary, of the present improved engine support and belt drive apparatus, taken from the side at which the spring capsule (not shown) is mounted. For clarity, the greater part of the drive belt is not shown. The phantom lines indicate deflection accompanying a vertical oscillation of the conventional engine with respect to the conventional transmission.

Figure 1:
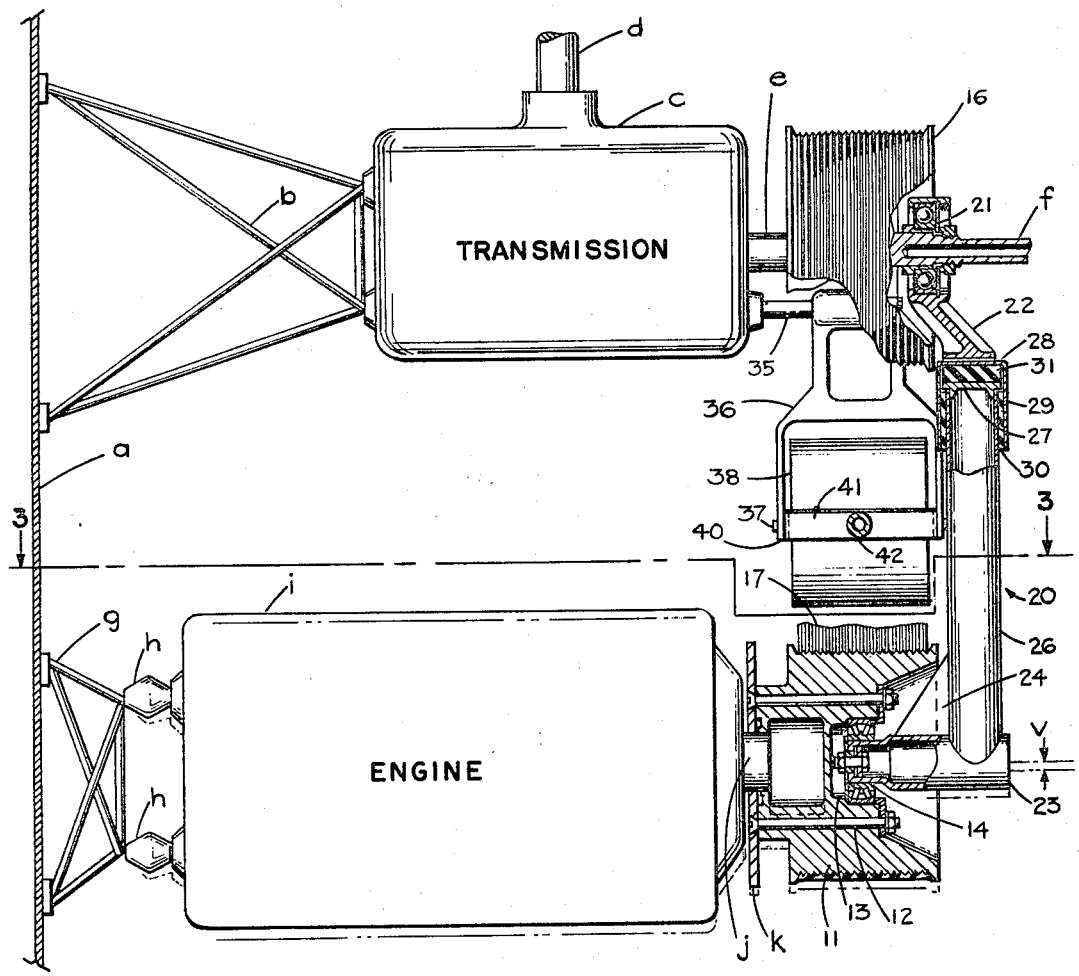

The type of helicopter installation for which the present invention serves most advantageously is shown in FIG. 1. Attached to a fire wall $a$ is a rigid truss mount $b$ by which the case of a transmission $c$ is rigidly supported. From its center rises the rotoshaft $d$ and at its aft end the transmission shaft $e$ extends horizontally aft. Conveniently the tail rotor power shaft $f$ may be an aft extension of the shaft $e$.

Below the transmission truss $b$ there is mounted on the fire wall $a$ an engine support truss $g$, at the aft side of which are a plurality of resilient engine mounts $h$, ordinarily referred to as "shock mounts." These support the forward end of an engine $i$ having a crankshaft $j$ projecting from the engine and extending aft beneath the transmission shaft $e$. The driving flange $k$ is permanently mounted on the crankshaft $j$. All the elements described so far are conventional.

As in said U.S. Patent No. 3,252,474, a driving sheave 11, shown in cross-section in FIG. 1, is mounted onto the crankshaft flange $k$ by a plurality of bolts 12. The sheave 11 extends somewhat aft of the end of the crankshaft $j$ and includes an axial, central cavity 13 in which is mounted a spherical or universal tilt-permitting bearing 14. Mounted onto the transmission shaft $e$ immediately above the driving sheave 11 is a driven sheave 16, shown fragmentarily in FIG. 1. Both sheaves 11, 16 are preferably of the multiple V-groove type, and a driving belt 17, shown in full in FIG. 2 but only fragmentarily at the lower part of FIG. 1, ribbed to fit in the grooves of the sheaves 11, 16, transmits the power from the engine $i$ to the transmission $c$.

As in said prior patent, a suspension strut generally designated 20 extends from the level of the transmission shaft $e$ to the crankshaft $j$ and serves to support the aft end of the engine $i$. A ball bearing 21 on the transmission shaft $e$ at the aft end of the driven sheave 16 serves as a suspension bearing to pivotally mount the upper strut end fitting 22, which encases the bearing 21 and extends downward and rearward to provide clearance from the sheaves 11, 16. At the lower end of the strut 20 a horizontal stub shaft 23 projects forwardly along the center line of the crankshaft $j$ to enter into and support the center race of the spherical bearing 14. A triangular plate 24, welded to the lower end of the strut 20, adds rigidity to the horizontal stub shaft 23.

Figure 2:
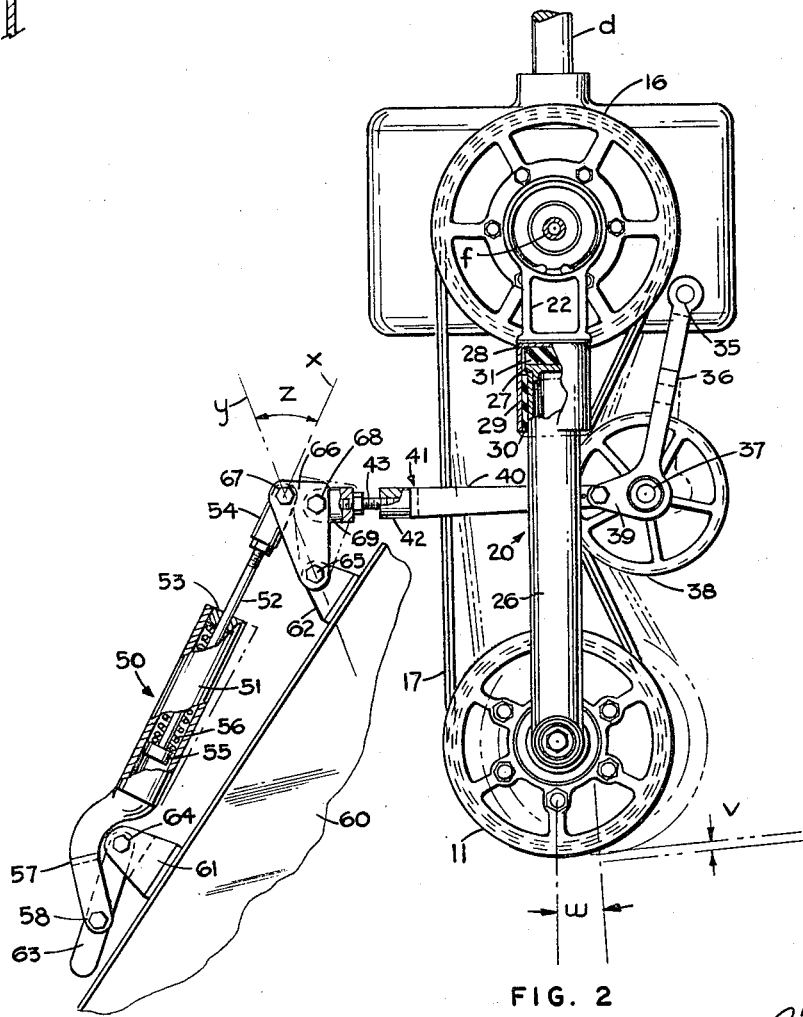
FIG. 2 is a view from the right end of FIG. 1, showing the belt and belt-tensioning capsule. The dashed lines show the position of the parts accompanying simultaneous vertical and yawing oscillations.

The provisions whereby the strut 20 is elastically cushioned both axially and in torsion, are shown in FIGS. 1 and 2. For the greater part of its length, the strut 20 is tubular. A lower tubular member 26, welded at its lower end to the stub shaft 23, in effect serves as the inner telescoping member of the assembly now to be described. Fitted within its upper end is a piston-like cap 27. At the bottom of the upper strut end fitting 22 is secured a transverse horizontal plate 28 which serves as the top surface of a short upper outer telescoping member 29. Like the inner telescoping member 26 it is tubular, but of substantially greater diameter. They are adhered together, spacedly from each other in co-axial, somewhat telescoping relationship, by a rubber-like sleeve 30. Between the piston-like cap 27 and transverse plate 28 a rubber-like compression cushion 31 is secured. It may be pre-stressed in compression at the time the lower tubular member 26 and short upper outer telescoping member 29 are adhered together by the attachment of rubber-like sleeve 30; or if desired may be adhered on both its upper and lower surfaces between the top plate 28 and piston-like cap 27 to serve alternately in compression and tension. As will be apparent, the sleeve 30 serves also to cushion axial deflections in shear as well as cushioning twisting deflections in torsional shear.

Both the compression cushion 31 and the sleeve 30 thus serve as resilient means to transmit and carry the weight of the shaft end of the engine. In so doing they allow a substantial freedom for oscillatory movements, that is, those essentially vertical oscillations in the level of the power shaft $j$ of the engine with reference to the level of the transmission shaft $e$ which it drives.

In order to maintain the belt 17 in tight driving relationship, belt tensioning means are necessary. In the present invention this means is of the idler type. A fixed idler suspension shaft 35 projects horizontally aft from the case of the transmission $c$. Swingably mounted on it is an idler yoke 36 which forks at its lower end to support an idler shaft 37. A cylinder drum-like idler wheel 38, whose width is approximately that of the belt 17, turns freely on the shaft 37. Adjacent to the bores in which shaft 37 is carried (to the left in FIG. 2) the yoke 36 has lobes 39, to which are mounted the arms 40 of an idler control yoke generally designated 41, whose control end 42, shown in section in FIG. 1, is drilled and tapped to receive an adjustable length rod. 43. Spring tension, exerted on the control end 42 by the rod 43, holds the idler wheel 38 against the belt 17 so as to maintain it under substantially constant driving tension.

The spring tension force is exerted by the spring capsule designated 50. It includes a hollow cylindrical case 51 and a central piston rod 52 which extends upward through the bore of an annular guiding sleeve 53 which forms the upper end of the case 51 and continues upward to an adjustable length rod end 54. The lower end of the rod 52 within the case 51 mounts a piston-like head 55. Between the head 55 and the annular guiding sleeve 53 is a compression spring 56.

The lower end of the case 51 terminates in a curved attachment hook portion 57 having at its end a transverse pivot pin 58. The curve in the attachment hook portion 57 brings it locally outward of the center axis $x$ of the casing 51 and rod 52, affording clearance for an overcenter mounting bracket 61.

A rigid structural member of the helicopter is shown schematically as a flanged rib 60. To it (or to any other fixed structural member of the helicopter in such location) are attached two brackets: a lower overcenter mechanism clevis bracket 61 and an upper bellcrank support bracket 62. The lower clevis bracket 61 extends to within the hook 57 and there mounts a lateral pin 64 which carries an over-center release handle 63, as shown in FIG. 2. The transverse pin 58 is mounted in this handle 63; the force of the compression spring thus holds the handle 63 securely in overcenter position, as shown in FIG. 2.

The upper bracket 62 mounts a fulcrum pin 65 parallel to the transverse pin 58. On it pivots a bellcrank 66, which may be generally triangular, consisting of two identical plates secured together, the rearward plate being shown in FIG. 2. In the corners of the triangular bellcrank are the fulcrum pin 65, a parallel transverse pin 67 which mounts the spring capsule rod end 54, and a third parallel pin 68 to which an end connector 69 for the adjustable length rod 43 is secured.

Considered functionally, the bellcrank 66 has two arm portions which turn about the fulcrum pin 65; a first arm portion, extending from the fulcrum pin 65 to the parallel pin 68, to which the belt idler wheel 38 is effectively connected, and a second arm portion entending from the fulcrum to the spring-driven rod end 54. The adjustable length members 52, 43 are adjusted when the helicopter is not in operation so that an axis $y$ connecting the pivot pin 65 with the pin 67 for the rod end 54, forms an angle of approximately 45° to the spring force axis $x$—that is, about midway to perpendicular.

If the engine $i$ is subjected in operation to vertical oscillations, the cushioning provided by the sleeve 30 and the compression cushion 31 effects an elastically limited telescoping action as between the short outer telescoping member 29 and the lower tubular telescoping member 26 FIG. 1 shows how the downward deflection $v$ of such vertical oscillations is accommodated. The belt 17 will be drawn down by the driving sheave 11, the idler wheel 38 being thrust to the right of FIG. 2. According to the prior state of the art, such vertical oscillations could not be accommodated resiliently, and would tend to shake the airframe. Pitching oscillations about a lateral axis could occur only about the universal bearing 14, with the forward end of the engine $i$ oscillating up and down, not about the center of gravity at the engine $i$ itself. In the present installation, both such pitching and vertical oscillations are accommodated, with the strut 20 alternately shortening and lengthening axially.

Figure 3:
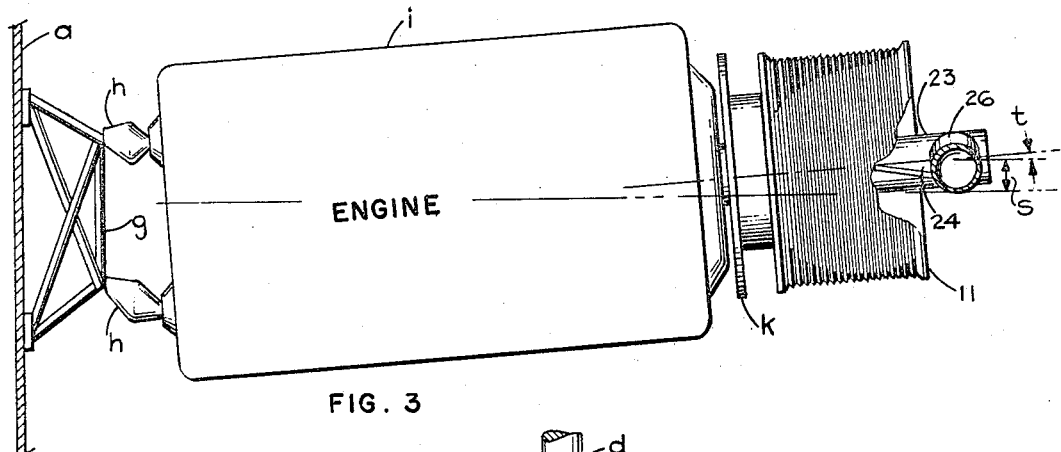
FIG. 3 is a sectional view taken along the line 3—3 of FIG. 1 with the engine deflected in yawing to the position shown by the dashed lines of FIG. 2.

In operation, several types of oscillations may occur simultaneously, including lateral oscillations and yawing oscillations as depicted in FIG. 2 and FIG. 3. With the prior type of swinging strut, there was free lateral swinging through the angle $w$ of FIG. 2 (resulting in the lateral displacement $s$ shown in FIG. 3); but the stub shaft 23 was restricted to parallel alignment with the transmission shaft $e$. The spherical bearing 14 therefore bore the entire brunt of the yawing oscillations. In the present invention, while there may be some angular movement in the spherical bearing 14 accompanying such yawing oscillations as depicted in FIG. 3, resilient twisting of the lower strut tube 26 within the rubber-like sleeve 30, permits the yawing oscillations to deflect the stub shaft 23 resiliently, greatly reducing wear on the bearing 14. In FIG. 3 it is shown how without any angular deflection of the universal bearing 14, the entire misalignment resulting in the course of a yawing oscillation may be absorbed by torsional shear in the rubberlike sleeve 30, as the stub shaft turns through the small angle $t$.

Contrasted with the deflection shown in phantom lines in FIG. 2, whenever the swing is to the left and the vertical deflection is upward, the idler wheel 38 must be free to take up the slack and swing correspondingly to the left. Yet throughout the range of its movement the belt 17 should be engaged at optimum driving tension.

For this purpose the present invention provides for maintaining belt tension under a relatively steady force by the pivot-mounting spring capsule and the bellcrank arrangement heretofore described. As the idler wheel 38 draws the idler control yoke 41 to the right, as indicated in FIG. 2, the lever arm from the bellcrank pivot pin 65 to the yoke end connector 69 remains nearly constant. The angle $z$, between the axis $x$ along which the spring force is exerted and the axis y between the bellcrank fulcrum 65 and the rod end 54, lessens very markedly during this deflection. Thus the angle of the bellcrank arm portion which extends to the pivot 66, set originally substantially midway to perpendicular to the spring axis $x$, will lessen as spring force of the compression spring 56 is increased, but on the reverse oscillatory movement will approach more closely to perpendicular to the axis $x$. Expressed as moments of forces, the shortening of its moment arm as the spring force increases with compression, and the lengthening of the moment arm as lesser spring force is exerted—results in maintaining a substantially constant tension on the idler yoke 41.

The pivoting of the spring capsule 50 about its transverse mounting pin 58 gives it the freedom to move with such deflection, as shown in FIG. 2. Another effect of such pivoting is to permit the over-center release handle 63 to be raised, against the tension of the spring 56, to permit the yoke 41 to move as far as possible to the right, releasing the belt tension, to permit the belt to be changed. Belts newly put into service stretch greatly during the first few hours of flight operation. Heretofore this has required repeated adjustments; the present pivoting capsule makes these unnecessary.

In flight, the present assembly has achieved quieter and smoother helicopter operation than was heretofore possible, permitting a high degree of freedom of engine oscillation, without relaxing the tension on the driving belt regardless of relative displacement of the driving sheave 11 from the driven sheave 16.

It is apparent that the present invention may be adapted and modified without departing from the teachings hereof. Accordingly the present invention should not be construed narrowly but rather as fully co-extensive with the claims.

We claim:

1. Improved engine support and belt drive apparatus for an engine mounted resiliently beneath a transmission shaft driven by the engine power shaft, comprising
    a driving sheave engaging the engine power shaft,
    a driven sheave mounted on the transmission shaft,
    belt means to transmit rotation of the driving sheave to the driven sheave,
    idler means applied to said belt means to maintain belt tension resiliently, and
    strut means, suspended swingably at the axis of the driven sheave, to support the power shaft end of the engine below and at a distance of separation from the transmission shaft, whereby to permit lateral oscillations of the engine below the transmission shaft,
    the strut means incorporating means to permit resilient cushioned axial deflection of the strut,
    whereby to permit vertical engine oscillations which shorten and lengthen the distance of separation, the idler belt tensioning means compensating for the alternate shortening and lengthening of such distance.

2. Improved engine support and belt drive apparatus as defined in claim 1,
    the said strut means having a tilt-permitting bearing at its point of support of the engine power shaft,
    whereby pitching oscillations of the engine are accommodated by the axial cushioning action of the strut.

3. Improved engine support and belt drive apparatus as defined in claim 2.
    the said tilt-permitting bearing being a universal bearing,
    the strut further having means to permit resilient cushioned torsional deflections,
    whereby yawing oscillations of the engine are accommodated in part by the torsional cushioning action of the strut.

4. For use in resiliently suspending the shaft end of an engine beneath a transmission shaft to which the engine's power is to be transmitted by a belt drive having a spring-urged idler to maintain the belt driving tension, an improved cushioned suspension strut comprising
    a suspension bearing pivotally mounted with respect to the axis of the transmission shaft, whereby to permit lateral swinging oscillations therebeneath,
    telescoping structure depending therefrom including
    an outer telescoping member, an inner telescoping member, and resilient means operating between the inner member and the outer member to transmit the weight of the shaft end of the engine and to permit axial oscillatory movements,
    a stub shaft projecting at the lower end of said telescoping strut structure, and
    a universal bearing mounted on the projecting end of said stub shaft,
    whereby to attach to and support the shaft end of said engine.

5. An improved cushioned suspension strut as defined in claim 4,
    the inner and outer telescoping members being tubes of circular cross-section,
    said resilient means including a rubber-like sleeve adhesively bonded therebetween, whereby to achieve a degree of torsional oscillatory freedom which in cooperation with the lateral swinging permits cushioned yawing oscillations of the engine.

6. An improved cushioned suspension strut as defined in claim 5,
    the inner telescoping member having at its end within the outer member a piston-like cap,
    the outer telescoping member having a transverse plate spaced from the said cap,
    said resilient means including a rubber-like compression cushion interposed between the said cap and transverse plate.

7. For installations in which an engine power shaft drives a transmission shaft through a belt, the combination of
    a driving sheave mounted on such engine power shaft,
    a driven sheave mounted on such transmission shaft, and a belt connecting them in driving relationship,
    resiliently cushioned means to support the power shaft of the engine at a different level than the transmission shaft which it drives, and to permit vertical oscillations of said level relative to the transmission shaft,
    belt idler means urged against the belt to maintain such driving relationship,
    spring force-exerting means to urge the idler means against the belt,
    and pivot-mounted means to exert the spring force at a lever arm which changes on pivoting to compensate for deflection,
    whereby to maintain the belt tension of such driving relationship regardless of such vertical oscillations in level of the engine power shaft.

8. For installations in which an engine power shaft drives a transmission shaft through a belt,
    the combination defined in claim 7,
    wherein said spring force-exerting means and said pivot mounting means together include
    a pivot mounted bell crank having two arm portions,
    a pivoted connection from one of said arm portions to the belt idler means,
    a pivot-mounted spring having an axis along which the spring force is exerted,
    a pivoted connection from the spring axis to the second arm portion of the bell crank,
    and means mounting the pivots to so align them that when the belt is tensioned by the idler means in median position, the said second arm portion of the bell crank from its pivot to said connection is at an angle substantially midway to perpendicular to the spring axis, and that said arm approaches more closely to perpendicular as a lesser spring force is exerted.

9. For installations in which an engine power shaft drives a transmission shaft through a belt,
the combination defined in claim 8,
together with over-center means selectively to position the pivoted spring for power-transmitting operation and to release it for releasing the belt idler means from the belt.

References Cited

UNITED STATES PATENTS 3,253,474    5/1966    Ballauer et al. _____ 74—228

FRED C. MATTERN, JR., *Primary Examiner.*

J. A. WONG, *Assistant Examiner.*